United States Patent
Iizuka

[19]

[11] Patent Number: 6,113,240
[45] Date of Patent: Sep. 5, 2000

[54] REFLECTION TYPE PROJECTOR

[75] Inventor: Takashi Iizuka, Saitama-ken, Japan

[73] Assignee: Asahi Kogaku Kogyo Kabushiki Kaisha, Tokyo, Japan

[21] Appl. No.: 09/313,760

[22] Filed: May 18, 1999

[30]  Foreign Application Priority Data

May 20, 1998  [JP]  Japan ................................ 10-138741

[51] Int. Cl.[7] ................................................. G03B 21/14
[52] U.S. Cl. .................. 353/31; 353/69; 353/70; 353/101; 348/744; 348/759; 348/766; 348/771
[58] Field of Search .................. 353/30, 31, 69, 353/70, 101; 348/744, 759, 766, 771

[56]  References Cited

U.S. PATENT DOCUMENTS 5,283,599  2/1994  Tejima et al. .
5,550,679  8/1996  Sugawara .
5,645,334  7/1997  Tejima et al. .

FOREIGN PATENT DOCUMENTS 5-27324  2/1993  Japan .

*Primary Examiner*—Russell Adams
*Assistant Examiner*—E P LeRoux
*Attorney, Agent, or Firm*—Greenblum & Bernstein P.L.C.

[57]  ABSTRACT

A reflection type projector includes a light source, a reflection type light modulating element, a projection lens, a condenser lens, and first and second adjusting mechanisms. An illumination light emitted from the light source passes through the condenser lens and enters into the reflection type light modulating element. The reflected light from the element passes through the condenser lens and is projected on the screen to form an image through the projection lens. The first adjusting mechanism adjusts the position of the projection lens along a direction perpendicular to the optical axis of the projection lens to move the position of the projected image. The second adjusting mechanism adjusts the position of the condenser lens along a direction parallel to the adjusting direction of the projection lens so that the reflected light enters into the projection lens.

11 Claims, 3 Drawing Sheets

REFLECTION TYPE PROJECTOR

BACKGROUND OF THE INVENTION

The present invention relates to a projector such as an LCD projector that is capable of adjusting a position of a projected image on a screen. Particularly, the present invention relates to a reflection type projector that is provided with a reflection type light modulating element.

Japanese Patent Provisional Publication No. Hei 5-27324 discloses an LCD projector that is capable of adjusting a position of a projected image on a screen. The disclosed LCD projector includes a transmission type LCD panel through which parallel illumination light from a light source is transmitted, a condenser lens and a projection lens. The illumination light is modulated by the LCD panel and projected onto the screen through the condenser lens and the projection lens.

The condenser lens and the projection lens are mounted on an adjusting mechanism so that the lenses are moved, as one unit, in a direction perpendicular to the optical axis. Movement of the lenses by the adjusting mechanism shifts the position of the projection area on the screen without changing a position of the main body of the projector and without distorting the projected image.

However, the conventional LCD projector that employs the transmission type LCD panel has a problem in that the light efficiency, which is defined as a ratio of the maximum output light quantity from the LCD panel to an incident light quantity to the LCD panel, deteriorates as the resolution becomes higher in a constant panel size. The transmission type LCD panel must include opaque portions for arranging driving circuits. In particular, an active matrix type LCD such as a TFT (Thin Film Transistor) has a switching element such as a transistor for an each pixel element. When the resolution becomes higher in a constant panel size, the pixel size and the driving circuit size become smaller. However, the size of the driving circuit can not be reduced at the same ratio as that of the pixel, and accordingly, the ratio of the opaque area increases, which deteriorates the light efficiency.

One solution to increase the resolution without deteriorating the light efficiency is adoption of a reflection type light modulating element such as a reflection type LCD panel or a DMD™ (Digital Micromirror Device™). The DMD™ has many micromirrors that are two-dimensionally arranged. The reflection angle of each micromirror is independently controlled. Since the driving circuits can be arranged on the back side of the reflection surface in the reflection type light modulating element, it is free from the light efficiency deterioration due to increasing of the resolution.

The reflection type light modulating element requires an inclined arrangement of the optical elements of the projector. In the inclined arrangement, an illumination light from a light source is incident on the reflection type light modulating element along an incident light path that is inclined with respect to the light modulating element, and the reflected light is incident on a projection lens along a reflected light path that is different from the incident light path. If the adjusting mechanism disclosed in the publication is used in the reflection type projector, and the position of the adjusting mechanism that includes the projection lens and the condenser lens is changed, the reflected light from the reflection type light modulating element is not efficiently incident on the projection lens and it may lower the luminance in the projected image and/or part of the projected image may lost. It should be noted that the efficiency is defined as a ratio of the projected light amount to the incident light amount, and it depends upon a positional relationship between a pupil of the light source and an entrance pupil of the projection lens. When these pupils are optically conjugate, the efficiency reaches a maximum value. When the pupils are not conjugate, the aperture stop of the projection lens shades part of the light, decreasing the efficiency. Accordingly, the adjusting mechanism disclosed in the publication is not applicable to the projector that employs the reflection type light modulating element.

SUMMARY OF THE INVENTION

It is therefore an object of the present invention to provide an improved reflection type projector that employs a reflection type light modulating element, which is capable of shifting a position of a projected image on a screen without declining the luminance of the projected image and without distorting the projected image.

For the above object, according to the present invention, there is provided the reflection type projector, which includes:

a light source for emitting illumination light;

a reflection type light modulating element for modulating the illumination light according to image information;

a projection lens for projecting the reflected light from the modulating element;

a condenser lens through which both of the illumination light entering to the modulating element and the reflected light from the modulating element are transmitted;

a first adjusting mechanism for adjusting the position of the projection lens along a direction perpendicular to the optical axis of the projection lens; and a second adjusting mechanism for adjusting the position of the condenser lens along a direction parallel to the adjusting direction of the projection lens.

With this construction, the adjustment of the projection lens by the first adjusting mechanism moves the projected image on the screen, and the adjustment of the condenser lens by the second adjusting mechanism changes the direction of the reflected light from the modulating element. Accordingly, proper adjustment by the second adjusting mechanism permits the effective incidence of the reflected light from the modulating element into the projection lens.

It is preferable that the projector further includes a linking system that causes movement of the second adjusting mechanism in accordance with a moving amount of the projection lens by the first adjusting system so that the reflected light from the modulating element enters into the pupil of the projection lens on the modulating element side.

With this construction, since an operation of one adjusting mechanism drives the other adjusting mechanism, it is not necessary to operate the first and second adjusting mechanisms independently, which simplifies the adjusting operation.

The linking system may be a controlling circuit that operates according to a computer software. Alternatively, the linking system may be a mechanical system that mechanically links movements of the first and second adjusting mechanism. The first and second adjusting mechanisms may include a lens supporting table that is movable in at least a predetermined direction, and a driving mechanism for moving the lens supporting table in the predetermined direction, respectively. In such a case, the linking system is included in a controlling unit that controls the driving mechanisms.

Each of the lens supporting tables may be movable in any direction in a plane perpendicular to the optical axis of the supported lens, and each of the driving mechanisms may move the table in the movable directions.

The linking system may controls the first and second adjusting mechanisms so as to satisfying the following condition:

$$\delta_2 = (1-M)\delta_1$$

where

M is magnification of the condenser lens, $\delta_1$ is a shift amount of the condenser lens, and $\delta_2$ is a shift amount of the projection lens.

For example, when the condenser whose magnification M equals −1 is used, the shift amount $\delta_2$ of the projection lens is twice the shift amount $\delta_1$ of the condenser lens. When the illumination light entering the condenser lens is a divergent light, the magnification M has a negative value, then $\delta_2 > \delta_1$. On the contrary, when the illumination light is a convergent light, the magnification M has a positive value, then $\delta_2 < \delta_1$.

In order to change the area size of the projected image, the projection lens may be a zoom lens that is able to change projecting magnification. Preferably, the zoom lens is a lens whose pupil position changes little.

DESCRIPTION OF THE ACCOMPANYING DRAWINGS

DESCRIPTION OF THE EMBODIMENT

Figure 1:
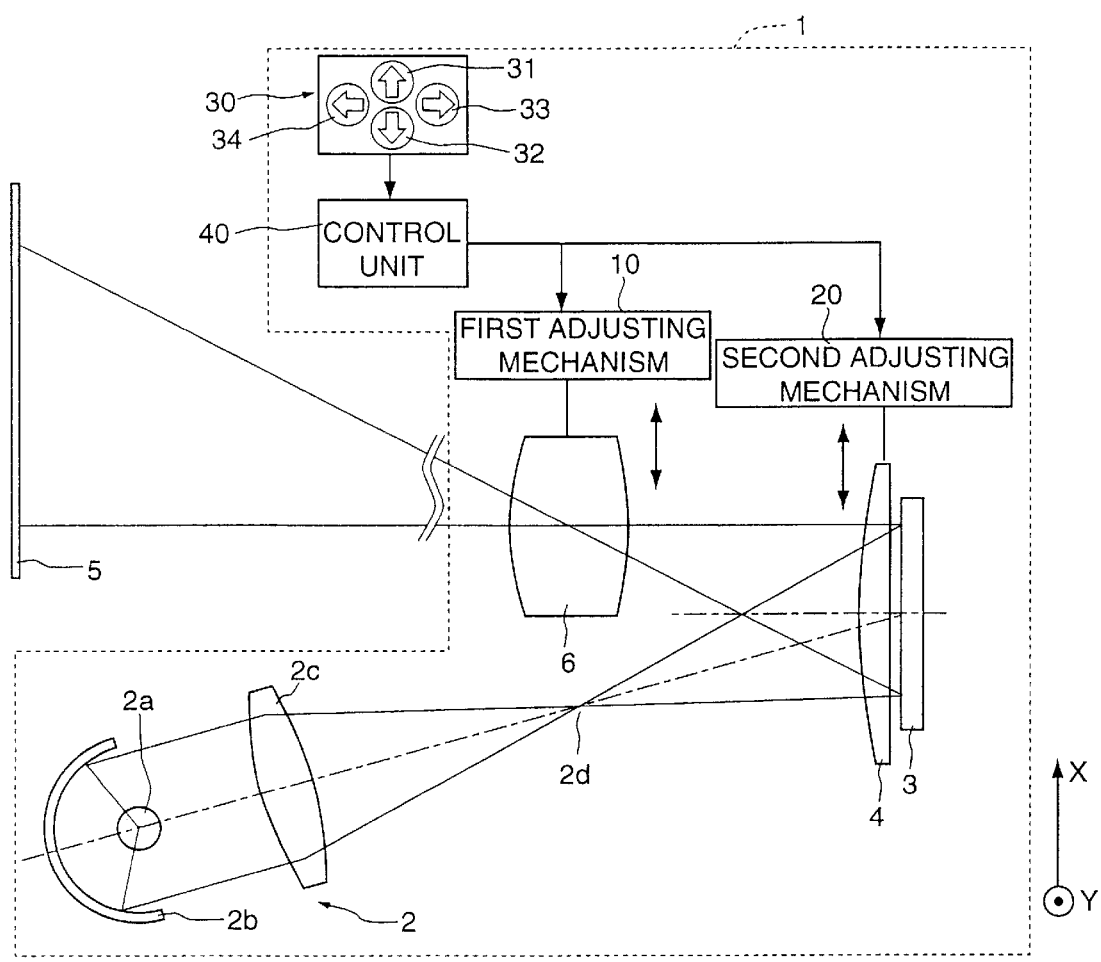
FIG. 1 shows a basic arrangement of the optical system and an electric circuit of a reflection type projector according to an embodiment.
Figure 2:
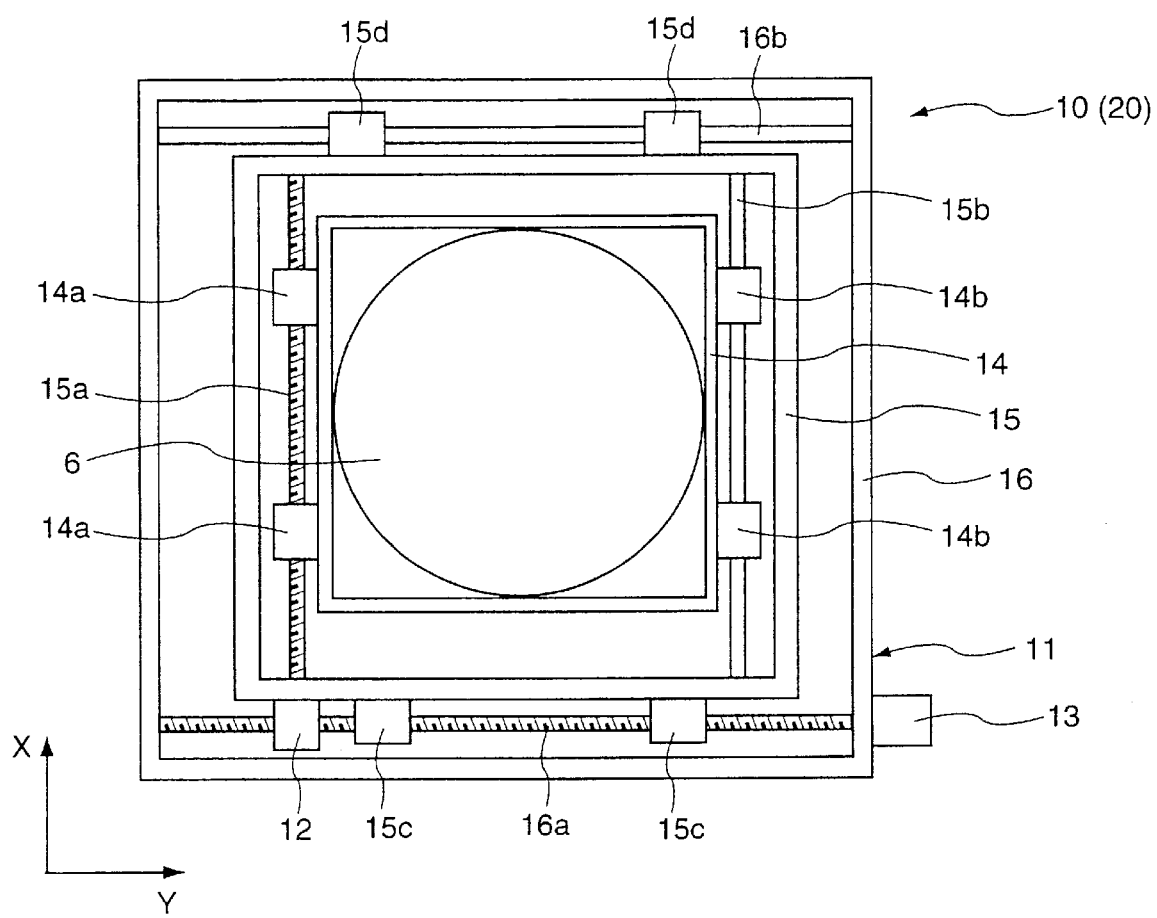
FIG. 2 shows one example of an adjusting mechanism according to the embodiment.

FIGS. 1 and 2 show a reflection type projector according to an embodiment: FIG. 1 is a schematic view of the entire system; and FIG. 2 is a front view of one example of an adjusting mechanism.

The optical system of the reflection type projector 1 according to the embodiment is, as shown in FIG. 1, provided with a light source 2 for emitting illumination light, a reflection type light modulating element 3 for modulating the illumination light according to image information, a condenser lens 4 that is arranged in front of the reflection type light modulating element 3, and a projection lens 6 for projecting the reflected light from the reflection type light modulating element 3 onto a screen 5.

The optical axis of the light source 2 is inclined with respect to a light receiving/reflecting surface (which will be referred to as a reference surface hereinafter) of the reflection type light modulating element 3 so that the illumination light from the light source 2 is incident on the element along an inclined incident light path. In this embodiment, a reflection type LCD panel is used as the reflection type light modulating element 3. The reference surface refers to a front surface of the reflection type LCD panel. The optical axes of the condenser lens 4 and the projection lens 6 are parallel to each other, and are substantially perpendicular to the reference surface of the reflection type light modulating element 3. In the FIG. 1, an X-axis is defined as to be parallel to the paper surface of FIG. 1 and to be perpendicular to the optical axes of the condenser lens 4 and the projection lens 6, and a Y-axis is defined as to be perpendicular to the paper surface of FIG. 1.

The light source 2 includes a high luminance lamp 2a such as a Xenon lamp, a halogen lamp, a metal halide lamp or a ultra-high pressure mercury lamp, a reflector 2b that converts a non-directional light emitted from the high luminance lamp 2a into a parallel light directed to the reflection type light modulating element 3 and a convergent lens 2c that converges the parallel light from the reflector 2b to form an imaginary secondary light source 2d between the convergent lens 2c and the reflection type light modulating element 3.

As described above, the reflection type light modulating element 3 is a reflection type LCD panel in the embodiment. However, another type of the light modulating element such as the DMD™ may be used instead. Since the driving circuits are arranged on the back side of the reflection surface in the reflection type light modulating element 3, the light efficiency is not deteriorated even if the resolution is increased. Accordingly, the light efficiency becomes larger than the conventional projector using a transmission type light modulating element at the same element size and the same resolution.

The condenser lens 4 is a positive lens that is arranged at the position where both the illumination light entering to the reflection type light modulating element 3 and the reflected light from the element 3 are transmitted therethrough. The projection lens 6 is a zoom lens having a plurality of lens groups. The projecting magnification varies depending on the distances among the lens groups. The projection lens 6 employs a lens of a type in which movement of an aperture stop due to zooming is relatively small in order to suppress movement of the pupil position on the side of the reflection type light modulating element 3. An example of such a zoom lens is disclosed in U.S. Pat. No. 5,550,679, teachings of which are incorporated herein by reference.

According to the above construction, the light emitted from the high luminance lamp 2a is reflected by the reflector 2b and is converged by the converging lens 2c to form the imaginary secondary light source at the front side of the condenser lens 4. The divergent illumination light from the imaginary secondary light source 2d and entering the condenser lens 4 is converted to a parallel light, and then the parallel light is incident on the reflection type light modulating element 3. The modulated and reflected light from the reflection type light modulating element 3 is converged through the condenser lens 4 and is projected, through the projection lens 6, to form an image on the screen 5.

The reflection type projector 1 is provided with a first adjusting mechanism 10 and a second adjusting mechanism 20. The first adjusting mechanism 10 adjusts the position of the projection lens 6 along directions perpendicular to the optical axis of the projection lens 6 to move the projected image on the screen 5 in two dimensional directions. The second adjusting mechanism 20 adjusts the position of the condenser lens 4 along directions perpendicular to the optical axis of the condenser lens 4 to changes the direction of the reflected light from the reflection type light modulating element 3. The first and second adjusting mechanisms move the projection lens 6 and the condenser lens 4 in the same direction to move the projected image.

The adjustment of the projection lens 6 in the directions perpendicular to the optical axis thereof moves the projected image on the screen. However, if the projection lens 6 is only adjusted, the reflected light from the reflection type light modulating element 3 is not efficiently incident on the projection lens 6. Therefore, the second adjusting mechanism 20 adjusts the position of the condenser lens 4 according to the adjustment of the projection lens 6 so that the reflected light is efficiently incident on the moved pupil of the projection lens 6.

Each of the first and second adjusting mechanisms 10 and 20 includes a lens supporting table that is movable in any direction in a plane perpendicular to the optical axis of the supported lens, and a driving mechanism for moving the lens supporting table in the movable directions. The driving mechanisms in the first and second adjusting mechanisms 10 and 20 are electrically controlled drivers such as motors, and they are controlled by a controlling unit (computer) 40 based on a command transmitted from a switch unit 30 that is operated by a user. The switch unit 30 is provided with four buttons 31, 32, 33 and 34. The buttons 31 and 32 correspond to movements of the projected image in upward and downward directions (i.e., in the X-axis direction), the buttons 33 and 34 corresponds to the movements of the projected image in rightward and leftward directions (i.e., in the Y-axis direction). The controlling unit 40 drives the driving mechanisms of the first and second adjusting mechanisms 10 and 20 to move the projected image in the direction corresponding to the operated button of the switch unit 30. Namely, the controlling unit 40 has a function of a linking system that determines the shift amount of the condenser lens 4 in accordance with the shift amount of the projection lens 6 by the first adjusting mechanism 10 and drives the second adjusting mechanism 20.

The relationship between the shift amount of the projection lens 6 and the shift amount of the condenser lens 4 varies depending on a magnification of the condenser lens 4. The controlling unit 40 controls the first and second adjusting mechanisms 10 and 20 so as to satisfy the following condition:

$$\delta_2 = (1-M)\delta_1$$

where

M is magnification of the condenser lens, $\delta_1$ is a shift amount of the condenser lens, and $\delta_2$ is a shift amount of the projection lens.

When the life-size magnification condenser lens is used, for example, M equals −1, the shift amount $\delta_2$ of the projection lens 6 is two times of the shift amount $\delta_1$ of the condenser lens 4.

FIG. 2 shows one example of a concrete construction of the first adjusting mechanism 10. It should be noted that the second adjusting mechanism 20 is constructed in the same manner as the first adjusting mechanism 10, and therefore only the first adjusting mechanism 10 will be described.

The mechanism 10 includes a lens supporting table 11 that is movable in both the X- and Y-axes directions and supports the projection lens 6, and motors 12 and 13 that are driving mechanisms for respectively driving the lens supporting table 11 in the X- and Y-axes directions. The lens supporting table 11 is provided with first, second and third rectangular frames 14, 15 and 16 that are different in size. The small first frame 14 is held inside the medium second frame 15 and this second frame 15 is held inside the large third frame 16. The first frame 14 is movable along the X-axis direction with respect to the second frame 15, and the second frame 15 is movable along the Y-axis direction with respect to the third frame 16.

The projection lens 6 is mounted on the first frame 14 and the third frame 16 is fixed to the body of the projector 1. The second frame 15 is provided with a pair of shafts 15a and 15b along the X-axis direction. The left shaft 15a is a screw shaft and the right shaft 15b is a simple shaft having no screw threads. The first frame 14 has a pair of guide portions 14a at the left side, and a pair of guide portions 14b at the right side. The guide portions 14a have screw holes through which the shaft 15a goes, and the guide portions 14b have holes through which the shaft 15b goes. The shaft 15a is driven by the motor 12 mounted on the second frame 15. The first frame 14 is supported by the connection of the guide portions 14a and 14b with the shafts 15a and 15b. The rotation of the motor 12 moves the first frame 14 in the X-axis direction with respect to the second frame 15.

The third frame 16 is provided with a pair of shafts 16a and 16b along the Y-axis direction. The lower shaft 16a is a screw shaft and the upper shaft 16b is a simple shaft having no screw threads. The second frame 15 has a pair of guide portions 15c at the lower side, and a pair of guide portions 15d at the upper side. The guide portions 15c have screw holes through which the shaft 16a goes, and the guide portions 15d have holes through which the shaft 16b goes. The shaft 16a is driven by the motor 13 mounted on the third frame 16. The second frame 15 is supported by the connection of the guide portions 15c and 15d with the shafts 16a and 16b. The rotation of the motor 13 moves the second frame 15 in the Y-axis direction with respect to the third frame 16.

According to the above construction, pressing the buttons 31 through 34 drives the first and second adjusting mechanisms 10 and 20 to move the projected image on the screen 5 in the X- or Y-axis direction without distorting the projected image. Further the zooming of the projection lens 6 adjusts the projection area size on the screen 5. Consequently, when the projector 1 must be located at a decentered position with respect to the center of the screen 5, the center of the projected image can be made coincident with the center of the screen 5. Further, when the distance between the projector 1 and the screen 5 is fixed, the appropriate size image can be projected on the screen 5.

Figure 3:
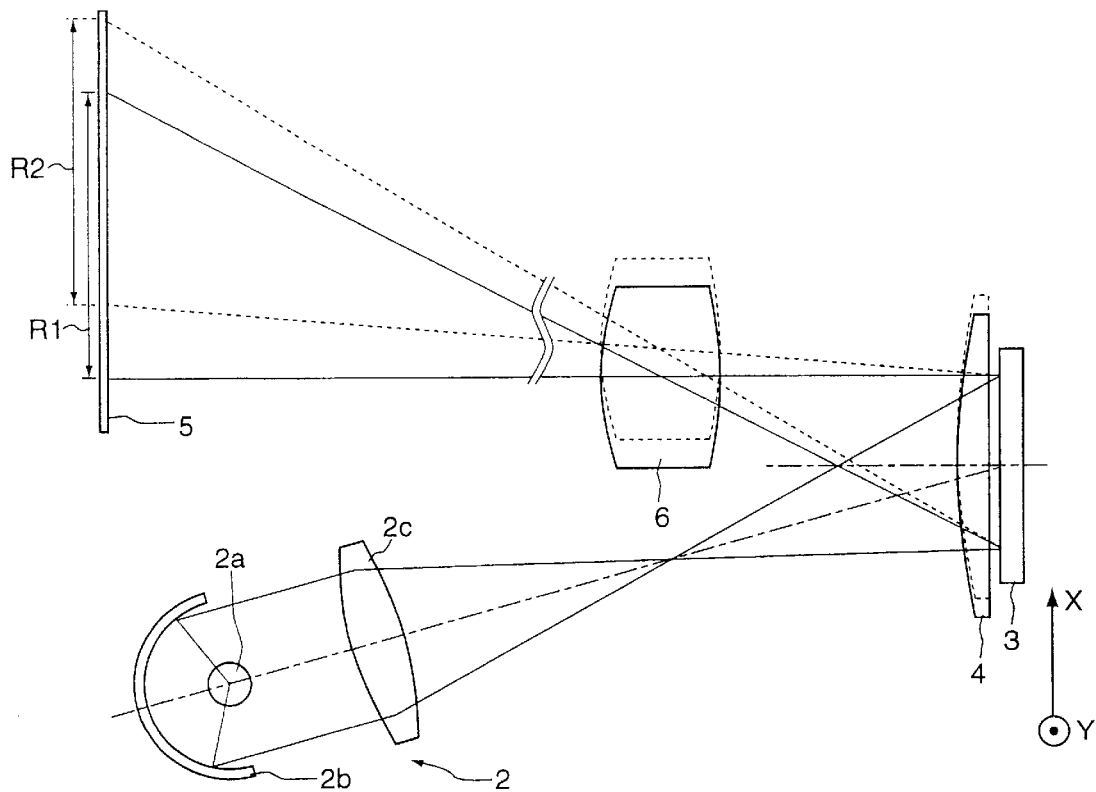
FIG. 3 shows the optical system of the embodiment when the projected image is shifted along an X-axis direction.
Figure 4:
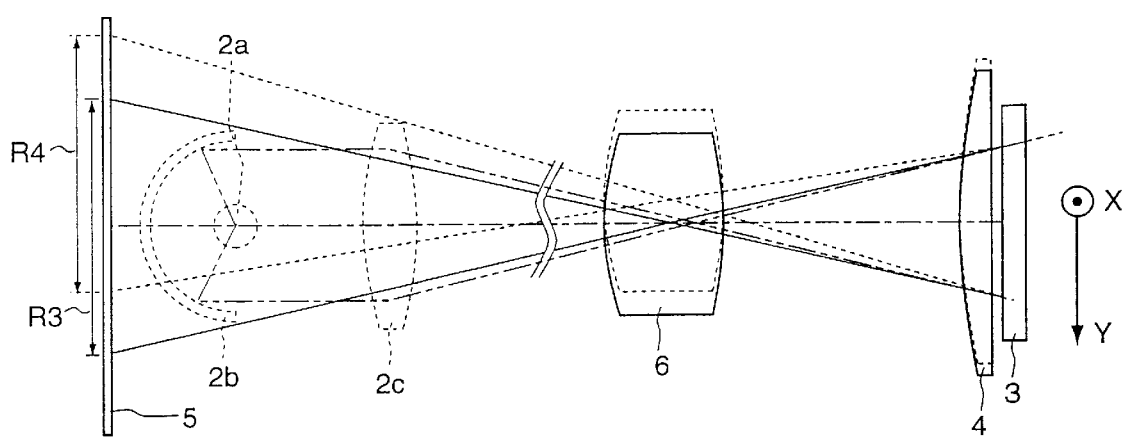
FIG. 4 shows the optical system of the embodiment when the projected image is shifted along a Y-axis direction.

The movement of the projected image on the screen 5 will be described with reference to FIGS. 3 and 4. FIG. 3 shows the optical system when the projected image is shifted along the X-axis direction and FIG. 4 shows the optical system when the projected image is shifted along the Y-axis direction.

When the projection lens 6 and the condenser lens 4 are located at the standard positions along the X-axis direction as shown by the solid liens in FIG. 3, the illumination light from the light source 2 is reflected by the reflection type light modulating element 3 as shown by the solid lines to form the image in an area $R_1$ on the screen 5. Pressing the upward button 31 of the switch unit 30 moves the projection lens 6 in the upward direction to the position shown by the broken line, for example. The condenser lens 4 also moves in the upward direction corresponding to the movement of the projection lens 6, and reaches the position shown by the broken line so that the reflected light is efficiently incident on the projection lens 6. In this condition, the reflected light from the reflection type light modulating element 3 forms the image in an area $R_2$, which is shifted upward from the area $R_1$, on the screen 5 through the optical path shown by the broken lines.

The moving amount of the projected image depends on the moving amount of the projection lens 6 and the magnification thereof. For instance, when a 1-inch LCD image is projected onto a 100-inch screen, the magnification of the projection lens equals −100, and a 1 mm shift of the projection lens 6 moves the projected image by 101 mm.

The projected image can be adjusted along the Y-axis direction in the same manner as the adjustment in the X-axis direction. FIG. 4 is a flat view of the optical system of the projector 1 shown in FIG. 3. When the projection lens 6 and the condenser lens 4 are located at the standard positions along the Y-axis direction as shown by the solid liens in FIG. 4, the optical axis of the light source 2 is coincident with the optical axes of the projection lens 6 and the condenser lens 4 in FIG. 4, the projected image is formed in an area $R_3$ of which center is coincident with the optical axes in FIG. 4. Pressing the rightward button 33 of the switch unit 30 moves the projection lens 6 and the condenser lens 4 in the rightward direction to the position shown by the broken line, for example. In this condition, the projected image is formed in an area $R_4$, which is shifted rightward from the area $R_3$, on the screen 5.

In the above embodiment, the adjusting mechanisms 10 and 20 are designed to move the lenses in the X- and Y-axes directions to move the projected image in the two dimensional directions. However, the adjustment is not limited to such a two dimensional adjustment, the adjusting mechanisms can be designed to move the lenses in one of the X-axis direction and the Y-axis direction.

Further, the adjusting mechanisms are not limited to the electrically controlled mechanisms, they may be manually operated. Particularly, the adjusting mechanisms move the lenses in the one dimensional direction, a mechanical linking system such as a rod connected to the adjusting mechanisms can be used.

Moreover, if the pupil of the projection lens 6 at the reflection type light modulating element 3 side moves due to the focusing or zooming, the condenser lens 4 may be adjusted in the X-axis direction at a shift amount that is determined independently from the shift amount of the projection lens 6 so that the reflected light is efficiently incident on the projection lens 6. In such a case, the condition "$\delta_2=(1-M)\delta_1$" is not satisfied.

The present disclosure relates to the subject matter contained in Japanese Patent Application No. HEI 10-138741, filed on May 20, 1998, which is expressly incorporated herein by reference in its entirety.

What is claimed is:

1. A reflection type projector, comprising:
    a light source for emitting illumination light;
    a reflection type light modulating element for modulating said illumination light according to image information;
    a projection lens for projecting the reflected light from said modulating element;
    a condenser lens through which both of said illumination light entering to said modulating element and said reflected light from said modulating element are transmitted;
    a first adjusting mechanism for adjusting the position of said projection lens along a direction perpendicular to the optical axis of said projection lens; and
    a second adjusting mechanism for adjusting the position of said condenser lens along a direction parallel to said adjusting direction of said projection lens.

2. The reflection type projector according to claim 1, further comprising a linking system that causes movement of said second adjusting mechanism in accordance with a moving amount of said projection lens by said first adjusting mechanism so that said reflected light from said modulating element enters into the pupil of said projection lens at the modulating element side.

3. The reflection type projector according to claim 2, wherein each of said first and second adjusting mechanisms includes a lens supporting table that is movable in at least a predetermined direction and a driving mechanism for moving said lens supporting table in at least said one dimensional direction, and wherein said linking system is included in a controlling unit that controls said driving mechanisms.

4. The reflection type projector according to claim 3, wherein each of said lens supporting tables is movable in any direction perpendicular to the optical axis of the supported lens, and wherein said driving mechanisms move said table in the movable directions.

5. The reflection type projector according to claim 2, wherein said linking system controls said first and second adjusting mechanisms so as to satisfy the following condition:

$$\delta_2=(1-M)\delta_1$$

where
M is magnification of the condenser lens,
$\delta_1$ is a shift amount of the condenser lens, and
$\delta_2$ is a shift amount of the projection lens.

6. The reflection type projector according to claim 1, wherein said projection lens is a zoom lens that is able to change projecting magnification.

7. A reflection type projector, comprising:
    a light source for emitting illumination light;
    a reflection member bearing an image to be reflected, said illumination light being reflected by said reflection member;
    a projection lens for projecting the light reflected by said reflection member;
    a condenser lens provided in front of said reflection member, the illumination light entering to said reflection member through said condenser lens, the reflected light from said reflection member being directed to said projection lens through said condenser lens;
    a supporting system for movably supporting said projection lens and said condenser lens, optical axes of said projection lens and said condenser lens being parallel to each other, said projection lens and said condenser lens being movable in a same direction perpendicular to the optical axes thereof, moving amount of said projection lens and said condenser lens satisfying a predetermined relationship.

8. The reflection type projector according to claim 7, wherein said projection lens and said condenser lens being moved such that the reflected light from said reflection member enters a reflection member side pupil of said projection lens.

9. The reflection type projector according to claim 7, wherein said predetermined relationship is:

$$\delta_2=(1-M)\delta_1$$

where
M is magnification of the condenser lens,
$\delta_1$ is a shift amount of the condenser lens, and
$\delta_2$ is a shift amount of the projection lens.

10. The reflection type projector according to claim 7, wherein said projection lens is a zoom lens that is able to change projecting magnification.

11. A reflection type projector for projecting an image formed on an original by illuminating the original and collecting the light reflected by the original, comprising:

a light source for emitting illumination light;

a projection lens for projecting the light reflected by said original;

a condenser lens provided in front of said original, the illumination light being incident on said original through said condenser lens, the light reflected by said original passing through said condenser lens and entering said projection lens;

a supporting system for movably supporting said projection lens and said condenser lens, optical axes of said projection lens and said condenser lens being parallel to each other, said projection lens and said condenser lens being movable in a same direction perpendicular to the optical axes thereof, moving amount of said projection lens and said condenser lens satisfying a predetermined relationship.

* * * * *